United States Patent
McDermott et al.

(10) Patent No.: US 12,430,393 B2
(45) Date of Patent: Sep. 30, 2025

(54) SYSTEMS AND METHODS FOR BALANCING DEVICE NOTIFICATIONS

(71) Applicant: PlentyofFish Media ULC, Dallas, TX (US)

(72) Inventors: Michael McDermott, Vancouver (CA); Maysam Emadi, Vancouver (CA); Fitsum Tekle, Vancouver (CA); Jacky Lok, Vancouver (CA)

(73) Assignee: PlentyofFish Media ULC, Dallas, TX (US)

( * ) Notice: Subject to any disclaimer, the term of this patent is extended or adjusted under 35 U.S.C. 154(b) by 103 days.

(21) Appl. No.: 18/152,752

(22) Filed: Jan. 10, 2023

(65) Prior Publication Data

US 2023/0244735 A1  Aug. 3, 2023

Related U.S. Application Data

(60) Provisional application No. 63/266,631, filed on Jan. 10, 2022.

(51) Int. Cl.
*G06F 16/9536* (2019.01)
(52) U.S. Cl.
CPC .............................. *G06F 16/9536* (2019.01)

(58) Field of Classification Search
CPC .................................................. G06F 16/9536
See application file for complete search history.

(56) References Cited

U.S. PATENT DOCUMENTS

| | | | | |
|---|---|---|---|---|
| 2006/0059147 | A1* | 3/2006 | Weiss | G06Q 50/01 |
| 2018/0189378 | A1* | 7/2018 | Barnea | G06F 16/287 |
| 2020/0329005 | A1* | 10/2020 | Anerella | H04L 51/52 |
| 2020/0403956 | A1* | 12/2020 | Adamski | H04L 51/216 |

\* cited by examiner

*Primary Examiner* — Khanh B Pham
*Assistant Examiner* — Ranjit P Doraiswamy
(74) *Attorney, Agent, or Firm* — Onyx IP Group

(57) ABSTRACT

A device may obtain, from a data structure, interaction information regarding first actions performed by a first device of a first entity and regarding second actions performed by a second device of a second entity. The first actions and the second actions may cause notifications to be provided to devices of a plurality of users. The device may determine, based on the interaction information, a first measure of similarity between the first entity and a first candidate entity, a second measure of similarity between the first entity and a second candidate entity, a first measure of popularity of the first candidate entity, and a second measure of popularity of the second candidate entity. The device may provide candidate information regarding the first candidate entity and regarding the second candidate entity, based on the measures of similarity and the measures of popularity.

20 Claims, 11 Drawing Sheets

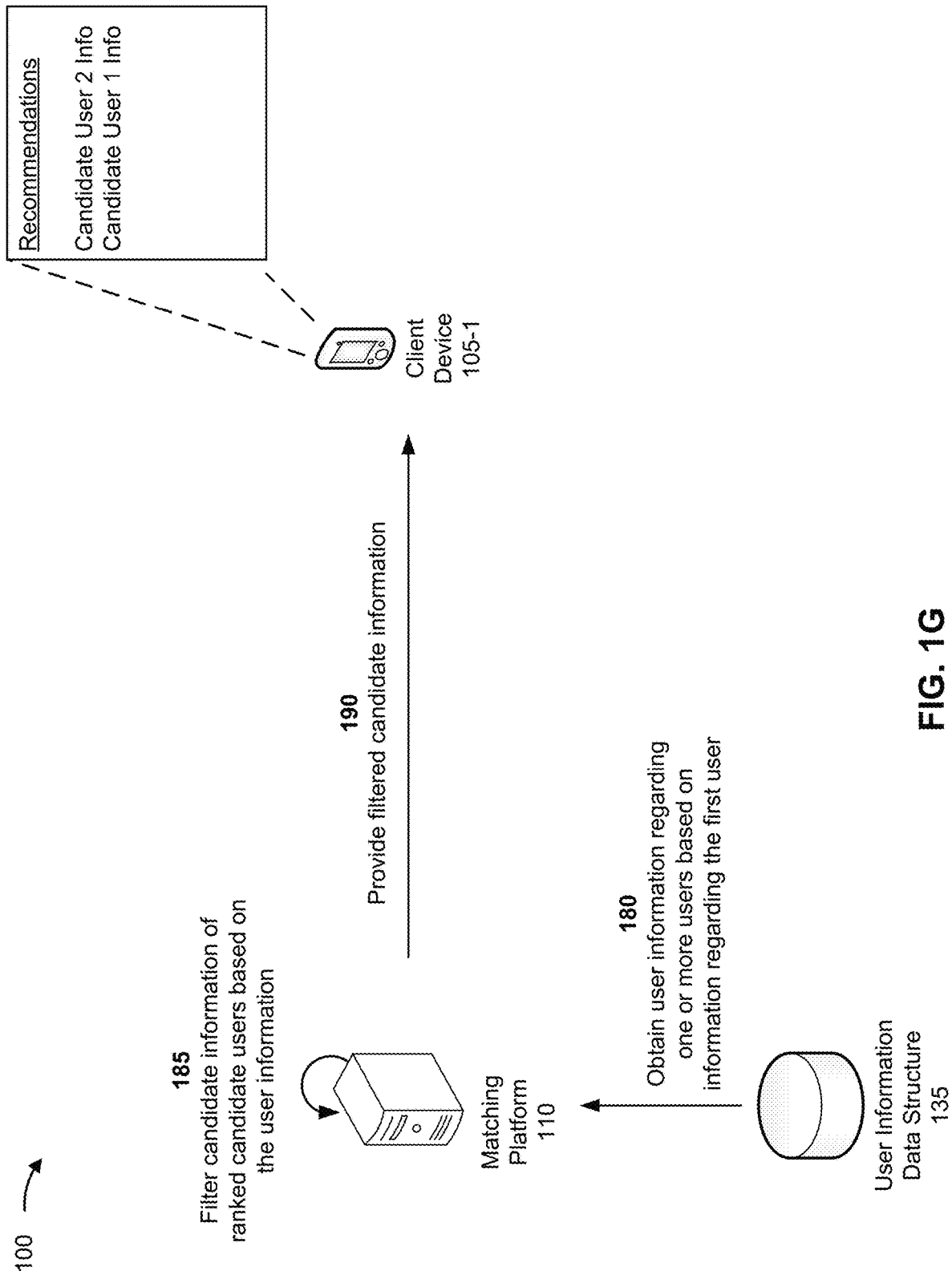

SYSTEMS AND METHODS FOR BALANCING DEVICE NOTIFICATIONS

RELATED APPLICATION

This application claims priority to U.S. Provisional Patent Application No. 63/266,631, entitled "SYSTEMS AND METHODS FOR BALANCING DEVICE NOTIFICATIONS," filed Jan. 10, 2022, which is incorporated herein by reference in its entirety.

BACKGROUND

A computing system may receive information from a plurality of devices. The information may include information regarding users associated with the device. The computing system may analyze the information to determine a similarity between the users. Based on analyzing the information, the computing system may provide notifications to one or more of the plurality of devices.

SUMMARY

In some implementations, a system for balancing device notifications includes one or more memories; and one or more processors, communicatively coupled to the one or more memories, configured to: obtain, from a data structure, first interaction information regarding first actions performed by a first device of a first user, wherein the first actions cause notifications to be provided to devices of a first plurality of users; obtain, from the data structure, second interaction information regarding second actions performed by a second device of a second user, wherein the second actions cause notifications to be provided to devices of a second plurality of users, and wherein the first plurality of users includes the second user or at least one of the second plurality of users; determine, based on the first interaction information and the second interaction information, a measure of similarity between the first user and a group of candidate users that includes the first plurality of users and the second plurality of users; determine, based on the measure of similarity, a first ranking of a first candidate user of the group of candidate users and a second ranking of a second candidate user of the group of candidate users; determine, based on the first interaction information and the second interaction information, a first measure of popularity of the first candidate user and a second measure of popularity of the second candidate user; adjust the first ranking based on the first measure of popularity; adjust the second ranking based on the second measure of popularity; and provide, to the first device, first candidate information regarding the first candidate user and second candidate information regarding the second candidate user, wherein the first candidate information and the second candidate information are ranked based on the adjusted first ranking and the adjusted second ranking.

In some implementations, a non-transitory computer-readable medium storing a set of instructions includes one or more instructions that, when executed by one or more processors of a device, cause the device to: obtain, from a data structure, first interaction information regarding first actions performed by a first device of a first entity, wherein the first actions cause notifications to be provided to devices of a first plurality of entities; obtain, from the data structure, second interaction information regarding second actions performed by a second device of a second entity, wherein the second actions cause notifications to be provided to devices of a second plurality of entities; determine, based on the first interaction information and the second interaction information, a first measure of similarity between the first entity and a first candidate entity from a group of candidate entities that includes the first plurality of entities and the second plurality of entities; determine, based on the first interaction information and the second interaction information, a second measure of similarity between the first entity and a second candidate entity from the group of candidate entities; determine, based on the first interaction information and the second interaction information, a first measure of popularity of the first candidate entity and a second measure of popularity of the second candidate entity; and provide, to the first device, first candidate information regarding the first candidate entity and second candidate information regarding the second candidate entity, wherein the first candidate information is ranked based on the first measure of similarity and the first measure of popularity, and wherein the second candidate information is ranked based on the first measure of similarity and the first measure of popularity.

In some implementations, a method for balancing device notifications includes obtaining, by one or more devices and from a data structure, first interaction information regarding first actions performed by a first device of a first entity, wherein the first actions cause notifications to be provided to devices of a first plurality of entities; obtaining, by the one or more devices and from the data structure, second interaction information regarding second actions performed by a second device of a second entity, wherein the second actions cause notifications to be provided to devices of a second plurality of entities; determining, by the one or more devices and based on the first interaction information and the second interaction information, a first measure of similarity between the first entity and a first candidate entity from a group of candidate entities, wherein the group of candidate entities includes the first plurality of entities and the second plurality of entities; determining, by the one or more devices and based on the first interaction information and the second interaction information, a second measure of similarity between the first entity and a second candidate entity from the group of candidate entities; determining, by the one or more devices and based on the first interaction information and the second interaction information, a first measure of popularity of the first candidate entity and a second measure of popularity of the second candidate entity; and providing, by the one or more devices and to the first device, first candidate information regarding the first candidate entity and second candidate information regarding the second candidate entity, wherein the first candidate information is provided based on the first measure of similarity and the first measure of popularity, and wherein the second candidate information is provided based on the second measure of similarity and the second measure of popularity.

BRIEF DESCRIPTION OF THE DRAWINGS

FIGS. 1A-1G are diagrams of an example implementation relating to balancing device notifications.

DETAILED DESCRIPTION

Figure 1A:
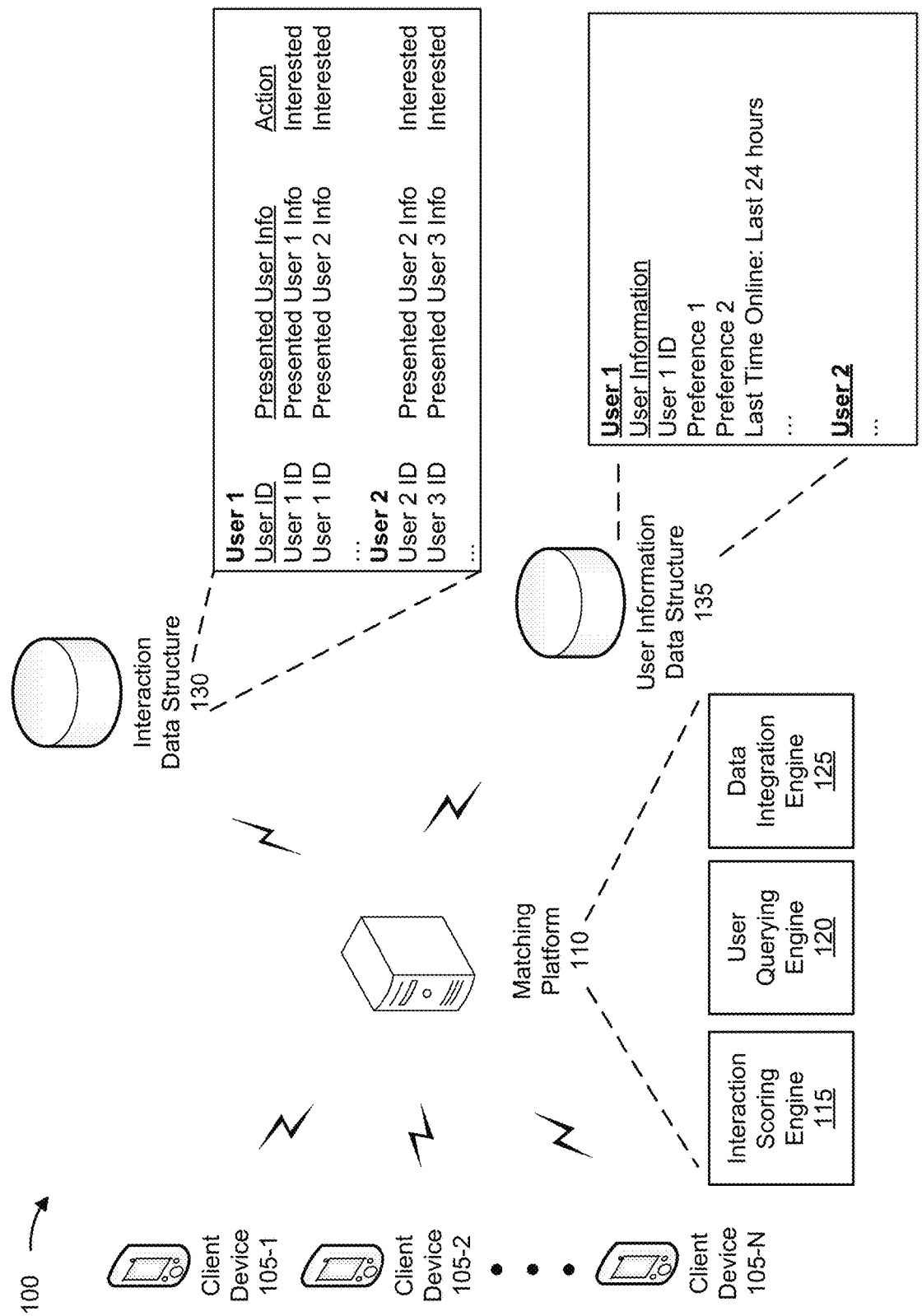

The following detailed description of example implementations refers to the accompanying drawings. The same reference numbers in different drawings may identify the same or similar elements.

A computer system may receive, from numerous devices, information regarding numerous users of the numerous devices. The computer system may analyze the information (which is a large amount of data) to determine a match between the users. Based on determining the match, the computer system may provide notifications to the devices of the users. The notifications may indicate a match between a portion of the users.

In some instances, a first device (of a first user) may receive a first quantity of notifications and a second device (of a second user) may receive a second quantity of notifications that is less than the first quantity of notifications. In some situations, the first quantity of notifications may be significantly more than the second quantity of notifications. Receiving a large quantity of notifications may negatively affect a user experience of the first user and, according, the first user may ignore the notifications. Accordingly, the first device may waste computing resources, network resources, storage resources when processing the first quantity of notifications.

In this regard, the first user may desire to reduce the first quantity of notifications. Accordingly, the first user may use the first device to submit additional information regarding the first user (e.g., more restrictive criteria), as one way to reduce a quantity of additional notifications. Conversely, the second user may desire to increase the second quantity of notifications (which may be minimal to none). Accordingly, the second user may use the second device to submit additional information regarding the second user (e.g., less restrictive criteria), as one way to reduce the second quantity of notifications.

The computer system may receive the additional information from the first device and from the second device and may analyze the additional information to redetermine matches for the first user and the second user. The process may be iterated numerous times until the first device receives a quantity of notifications satisfactory to the first user or until the second device receives a quantity of notifications satisfactory to the second user. During each iteration, the amount of data processed by the computer system may increase. Providing information regarding users and processing the information regarding the users in this manner wastes computing resources, network resources, storage resource, and other types of resources.

Implementations described herein are directed to a system (e.g., a matching platform) that uses interaction information, regarding actions performed by devices of entities (e.g., thousands or millions of entities), to identify candidate entities that may be a match for a particular entity. The actions (performed by the devices) may include one or more actions performed by a device of the particular entity.

As used herein, the term "entity" may be used to identify a user (or an individual), a group of users, or a business, etc. of an entity that may be matched with another entity or an item. The item may include a good or a service. As explained herein, a device of an entity may perform an action to indicate an interest in another entity.

In some implementations, the system may use a computational algorithm to process the interaction information. As an example, the system may generate a graphical representation of the interaction information and may use the computational algorithm to process the graphical representation. In some examples, the graphical representation may include a plurality of nodes and include connections (or edges) between the plurality of nodes. The plurality of nodes may represent a plurality of entities. A connection between two nodes may indicate that a first entity (represented by a first node) has used a device to perform an action expressing an interest in a second entity (represented by a second node).

In some implementations, when using the computational algorithm to process the interaction information, the system may perform Monte Carlo simulations to traverse the graphical representation to identify the candidate entities for the particular entity (e.g., to identify candidate information regarding the candidate entities for the particular entity). The system may perform numerous Monte Carlo simulations (e.g., thousands of simulations) to identify the candidate entities.

In some implementations, the system may determine a measure of popularity of the candidate entities (e.g., based on the interaction information). In this regard, the system may determine that a first measure of popularity of a first candidate user exceeds a second measure of popularity of a second candidate user. In other words, the system may determine that a first quantity of notifications received by a device of the first candidate entity exceeds a second quantity of notifications received by a device of the second candidate entity. The second quantity of notifications (e.g., minimal to none) may not satisfy a quantity threshold.

Accordingly, the system may rank the second candidate entity higher than the first candidate entity prior to providing candidate information (regarding the first candidate entity and the second candidate entity) to the device of the particular entity. The system may rank the second candidate entity higher than the first candidate entity to increase a likelihood of the particular entity using the device perform an action indicating an interest in the second candidate entity (e.g., over the first candidate entity). Therefore, by ranking the second candidate entity higher than the first candidate entity, the system may increase the second quantity of notifications and may reduce a quantity of additional notifications provided to the device of the first candidate entity.

In some examples, the quantity threshold may be determined by an administrator of the system. Additionally, or alternatively, the system may be pre-configured with the quantity threshold.

By processing the interaction information as described herein, the system may preserve computing resources, network resources, storage resources, among other types of resources that would have been used to process large quantity of notifications, to provide additional information regarding entities, and to process the additional information regarding the entities. In some implementations, the system may obtain information regarding a plurality of entities, based on information regarding the particular entity. The system may filter the candidate information using the information regarding the plurality of entities prior to providing the candidate information to the device of the particular entity.

The system described herein may be used to identify a match between entities (e.g., in the context of dating, the context of employment, the context of a marketplace that connects sellers and buyers, etc.).

FIGS. 1A-1G are diagrams of an example 100 relating to balancing device notifications (e.g., notifications associated with a matching process). As shown in FIG. 1A, example 100 includes a plurality of client devices 105 (collectively "client devices 105" and individually "client device 105"), a matching platform 110, an interaction data structure 130, and a user information data structure 135. In some examples, the system (discussed above) may include matching platform 110, interaction data structure 130, and/or user information data structure 135.

Client device 105 may include one or more devices capable of receiving, generating, storing, processing, and/or providing information associated with relating to balancing device notifications, as described elsewhere herein. For example, client device 105 may receive (e.g., from matching platform 110) candidate information regarding candidate entities. A candidate entity may refer to an entity whose information is provided to client device 105. Information regarding a candidate entity may be referred to as candidate information. Client device 105 may perform an action to indicate an interest in a candidate entity (of the candidate entities) and, accordingly, may generate interaction information that is provided to matching platform 110.

Client device 105 may perform the action based on an entity interacting with the information regarding the candidate entity, using client device 105, to indicate an interest in the candidate entity. The entity may interact with the information regarding the candidate entity by clicking on the information provided by a display of client device 105, performing a swiping gesture on the display when the information is provided by the display, submitting the information, etc.

Client device 105 may provide the interaction information to interaction data structure 130 and/or matching platform 110 and matching platform 110 may provide a notification, indicating the interest, to a device of the candidate entity based on receiving the interaction information. After the interaction information has been provided to matching platform 110, the candidate entity may be referred to as a presented entity. In some situations, a presented entity (whose information has been provided to one entity) may be selected as a candidate entity for another entity. In some implementations, client device 105 may communicate with matching platform 110 and/or interaction data structure 130 via a Representational state transfer (REST) application programming interface (API).

Matching platform 110 may include one or more devices capable of receiving, generating, storing, processing, and/or providing information associated with relating to balancing device notifications (e.g., notifications associated with a matching process), as described elsewhere herein. For example, matching platform 110 may be configured to analyze information stored in interaction data structure 130 to identify candidate entities that may match a particular entity, as described in more detail below.

In some examples, the candidate entities may include one or more first presented entities associated with devices that have received a first quantity of notifications (indicating an interest) that does not satisfy the quantity threshold and one or more second presented entities associated with devices that have received a second quantity of notifications (indicating an interest) that satisfy the quantity threshold. Matching platform 110 may be configured to increase the first quantity of notifications and decrease a quantity of additional notifications provided to the devices of the one or more second presented entities, as described elsewhere herein.

As shown in FIG. 1A, matching platform 110 may include an interaction scoring engine 115, a user querying engine 120, and a data integration engine 125. Interaction scoring engine 115 may include one or more devices capable of obtaining information from interaction data structure 130 and analyzing the information to identify information regarding entities that may be candidate entities, as described elsewhere herein. In some implementations, interaction scoring engine 115 may include a first module configured to determine a measure of similarity between an entity and candidate entities and include a second module configured to determine a measure of popularity of the candidate entities, as described in more detail below.

User querying engine 120 may include one or more devices capable of obtaining information from user information data structure 135. The information may identify one or more entities and may be obtained based on information regarding one or more preferences (of an entity) with respect to candidate entities. Data integration engine 125 may include one or more devices capable of filtering information regarding candidate entities using the information obtained from user information data structure 135. Additionally, or alternatively, data integration engine 125 may be configured to filter information of a candidate entity (identified by interaction scoring engine 115) that has been previously provided to a client device 105, as explained elsewhere herein.

Interaction data structure 130 may include a data structure (e.g., a database, a table, or a linked list) that stores interaction information regarding actions performed by client devices of entities. For example, the interaction information may include information identifying entities, information identifying actions performed by client devices of the entities, and presented user information identifying presented entities. In some implementations, the interaction information may be generated the client devices and provided to interaction data structure 130 via a REST API. In some examples, the interaction information may be included in a stream of data (e.g., an interaction log stream) that is provided to interaction data structure 130.

As shown in FIG. 1A, as an example, the interaction information of a first entity (e.g., a first user) may include information identifying the first user in association with presented user information regarding a first presented entity and information identifying a first action performed by a first device of the first user to indicate an interest in the first presented entity. The interaction information of the first user may be referred to as first interaction information.

As shown in FIG. 1A, the first interaction information may further include the information identifying the first user in association with presented user information identifying a second presented entity and information identifying a second action performed by a device of the first user to indicate an interest in the second presented entity. In some implementations, interaction data structure 130 may include information identifying an action (performed by the device of the first user) indicating a lack of interest in a presented entity.

User information data structure 135 may include a data structure (e.g., a database, a table, or a linked list) that stores user information regarding a plurality of entities. For example, the user information may include information identifying the plurality of entities and/or information identifying one or more preferences of the plurality of entities with respect to candidate entities. In some situations, user information data structure 135 may receive the user information from devices of the plurality of entities, as part of the plurality of entities registering to use matching platform 110.

In some implementations, the user information regarding one or more entities, of the plurality of entities, may be used to filter the candidate information regarding the candidate entities, as explained below.

In some examples, with respect to the context of dating, the preferences may include a preference with respect to a gender, geographical location or region, hobby, age group (e.g., a particular age, a range of ages, etc.), one or more other demographics, online presence (e.g., a last date time a candidate entity was online), etc.

In some examples, with respect to the context of employment, the preferences may include a preference with respect to a level of education, skill, level of experience, etc. In some situations, one or more preferences of one context may be included in preferences of another context. In some situations, an entity having user information stored in user information data structure 135 may be a presented entity having information is stored in interaction data structure 130. In this regard, the presented user information (regarding the presented entity) stored in interaction data structure 130 may be obtained from the user information (regarding the entity) stored in user information data structure 135.

As shown in FIG. 1A, as an example, user information of the first entity may include information identifying the first user, information identifying a first preference (e.g., a gender), information identifying a second preference (e.g., a distance threshold between the first user and candidate entities), information identifying a third preference with respect to an online presence, etc. The information identifying the first entity may include a name of the first user, a username of the first name, an image of the first entity, a video of the first entity, etc.

In the example that follows, the first user may desire to identify one or more candidate entities (e.g., candidate users) that may be match for the first user. While the example may be described in the context of dating, implementations described herein may be applicable to the context of employment, the context of a marketplace that connects sellers and buyers, etc.

Figure 1B:
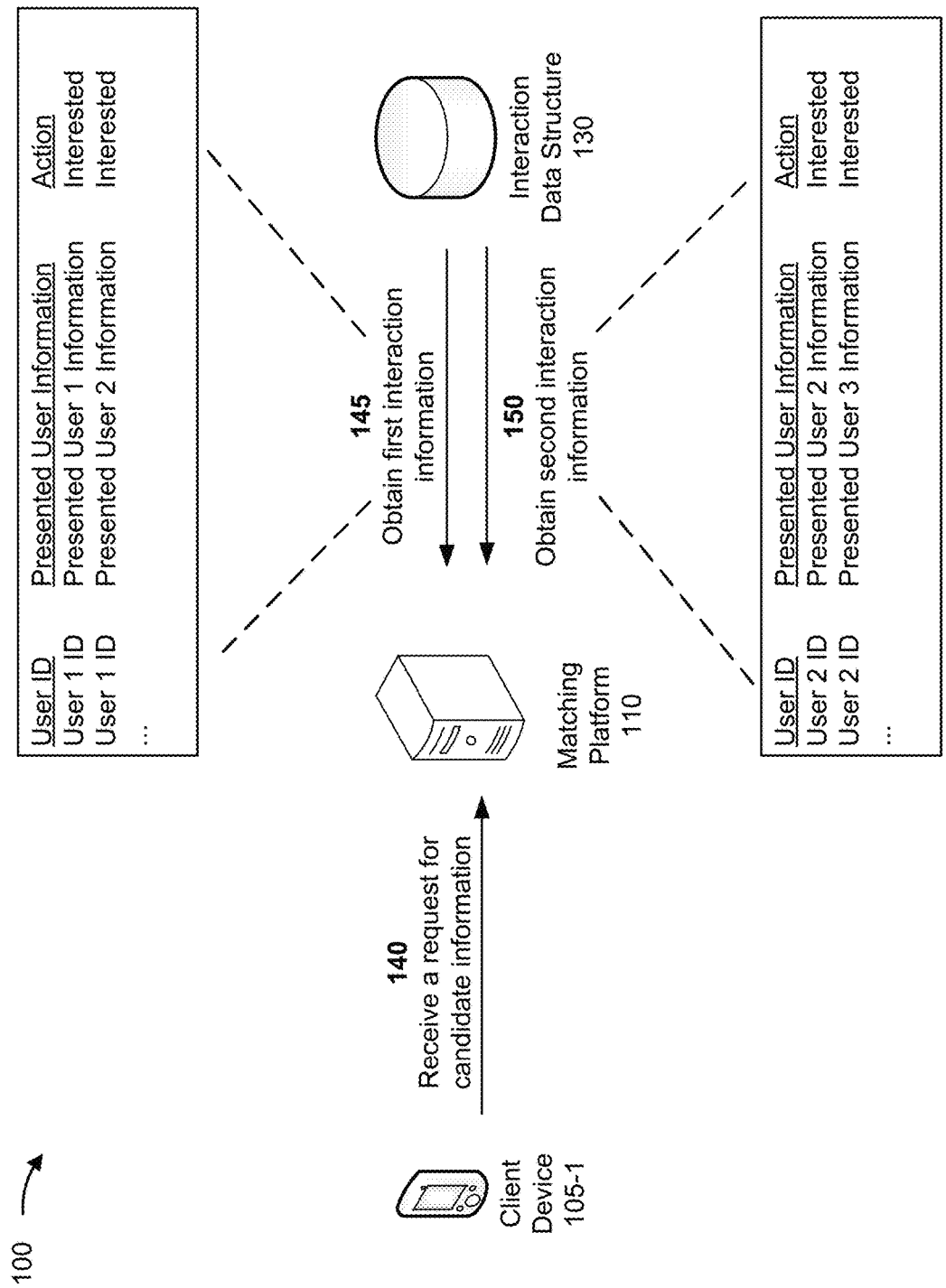

As shown in FIG. 1B, and by reference number 145, matching platform 110 may receive a request for candidate information. For example, matching platform 110 may receive the request from client device 105-1 of the first user. For instance, client device 105-1 may provide the request in order to obtain the candidate information of candidate users that may be a match for the first user. The request may include the information identifying the first user, such as an identifier of the first user, the name of the first user, the username of the first user, etc.

As shown in FIG. 1B, and by reference number 145, matching platform 110 may obtain first interaction information. For example, based on receiving the request from client device 105-1, matching platform 110 may obtain the first interaction information regarding first actions performed by client device 105-1. The first actions may include actions that have caused notifications to be provided to devices of a first plurality of users (e.g., a first plurality of presented entities). The first actions indicate an interest of the first user in the first plurality of users.

Matching platform 110 may obtain the first interaction information from interaction data structure 130. For example, matching platform 110 may provide a first interaction information request to interaction data structure 130 and obtain the first interaction information from interaction data structure 130 based on the first interaction information request. The first interaction information request may include the information identifying the first user. The information identifying the first user may be used to search interaction data structure 130 and obtain the first interaction information.

As shown in FIG. 1B for example, the first interaction information may indicate that the first device performed an action to indicate an interest in a first presented entity (e.g., first presented user) and another action to indicate an interest in a second presented entity (e.g., second presented user).

Matching platform 110 may determine that additional interaction information, regarding one or more other users that are similar to the first user, is to be obtained from interaction data structure 130. In some instances, a user may be similar to the first user if the user expressed an interest in a portion of the plurality of first users. In some examples, matching platform 110 may analyze the first interaction information to identify the presented user information of presented users included in the first interaction information. Matching platform 110 may determine to obtain, from interaction data structure 130, interaction information regarding a device of at least one user of the first plurality of users. In this regard, matching platform 110 may obtain information identifying the at least one user from the first interaction information and provide, to interaction data structure 130, a second interaction information request including the information identifying the at least one user. The information identifying the at least one user may include an identifier of the at least one user, the name of the at least one user, the username of the at least one user, etc.

Additionally, or alternatively, to obtaining the information identifying the at least one user, matching platform 110 may determine to obtain, from interaction data structure 130, interaction information regarding a device of a user that has indicated an interest in a first number threshold of the first plurality of users. In this regard, matching platform 110 may provide a third interaction information request, to interaction data structure 130, to obtain interaction information regarding the device of the user that has indicated an interest in the first number threshold of the first plurality of users. The third interaction information request may include the information identifying the first plurality of users (obtained from the first interaction information) and information identifying the first number threshold. In some implementations, matching platform 110 may be pre-configured with the first number threshold.

As shown in FIG. 1B, and by reference number 150, matching platform 110 may obtain second interaction information. For example, based on providing the second interaction information request or the third interaction information request, matching platform 110 may obtain the second interaction information regarding second actions performed by client device 105-2 of a second entity (e.g., a second user). The second actions may include actions that have caused notifications to be provided to devices of a second plurality of users. The second actions may indicate an interest of the second user in the second plurality of users (e.g., a second plurality of presented entities).

As shown in FIG. 1B for example, the second interaction information may indicate that the second device performed an action to indicate an interest in the second presented entity (e.g., second presented user) and another action to indicate an interest in a third presented entity (e.g., third presented user). In some implementations, matching platform 110 may determine to obtain additional interaction information, in a manner similar to the manner described above.

Figure 1C:
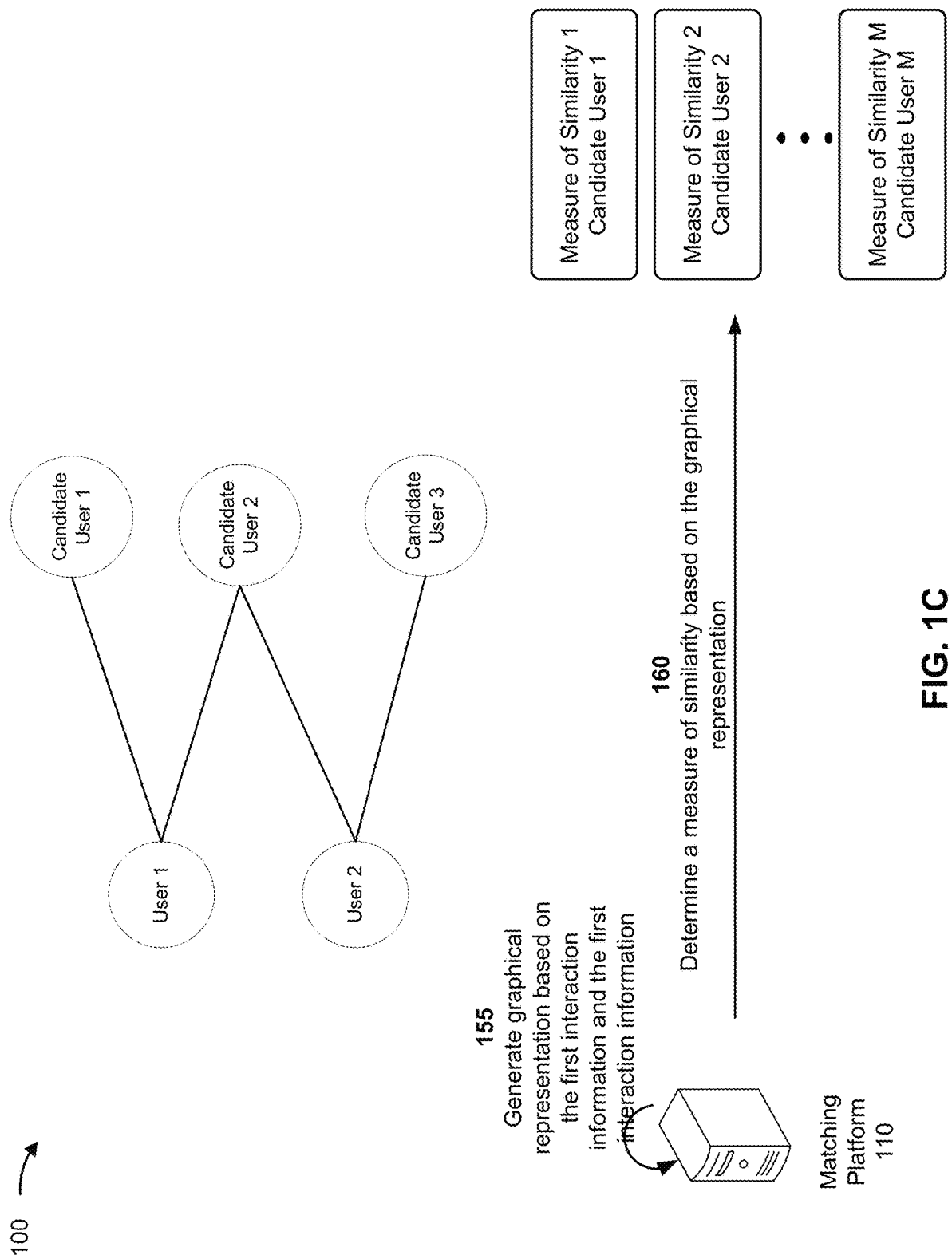

As shown in FIG. 1C, and by reference number 155, matching platform 110 may generate a graphical representation based on the first interaction information and the first interaction information. For example, matching platform 110 may generate a graph that includes a plurality of nodes and connections (or edges) between the plurality of nodes. The plurality of nodes may represent a group of candidate users that includes the first plurality of users and the second plurality of users. For instance, the plurality of nodes may include a first node representing the first user, a second node representing a first candidate user (of the group of candidate users), and a third node representing a second candidate user (of the group of candidate users).

The connections between the plurality of nodes may indicate an interaction between users represented by the nodes. For example, a connection between the first node and the second node may indicate that the first user has expressed an interest in the first candidate user. Similarly, a connection between the first node and the third node may indicate that the first user has expressed an interest in the second candidate user. As shown in FIG. 1C, for example, nodes representing candidate users may be provided on a first side of the graphical representation and other nodes (that are representing the first user and users similar to the first user) may be provided on a second side of the graphical representation. In some instance, the first side may be opposite the second side.

As shown in FIG. 1C, and by reference number 160, matching platform 110 may determine a measure of similarity based on the graphical representation. For example, matching platform 110 may determine the measure of similarity between the first user and the group of candidate users using the graphical representation generated based on the first interaction information and the second interaction information. In some instances, matching platform 110 may determine the measure of similarity using interaction scoring engine 115 (e.g., using the first module of interaction scoring engine 115). As an example, matching platform 110 may determine a first measure of similarity between the first user and the first candidate user, a second measure of similarity between the first user and the second candidate user, and so on. In some implementations, a measure of similarity may include a score.

In some implementations, matching platform 110 may determine the measure of similarity by traversing the graphical representation using a computational algorithm. As an example, matching platform 110 traverses the graphical representation using multiple different paths. In some implementations, matching platform 110 traverses the graphical representation by performing Monte Carlo simulations. For example, matching platform 110 may perform thousands or millions of Monte Carlo simulations. In some examples, matching platform 110 may be pre-configured with information identifying a quantity of times that the Monte Carlo simulations are to be performed. Additionally, or alternatively, an administrator of matching platform 110 may be provided with the information identifying the quantity of times that the Monte Carlo simulations are to be performed.

In some implementations, matching platform 110 may perform the Monte Carlo simulations (to traverse the graphical representation) using a Stochastic Approach for Link-Structure Analysis (SALSA) algorithm, a pure random algorithm, a weighted random walk algorithm, etc. By performing the quantity of Monte Carlo simulations as described above, matching platform 110 may increase accuracy and consistency and reduce delay associated with identifying candidate users for the first user relative to requiring computing resources to be allocated for tens, hundreds, or thousands of operators to manually analyze the first interaction information and the second interaction information to identify the candidate.

Matching platform 110 may monitor a quantity of times a node is visited during a traversal of the graphical representation. For example, matching platform 110 may determine a first quantity of times the second node is visited based on traversing the graphical representation (e.g., a quantity of times the second node is visited during the traversal of the graphical representation). The first measure of similarity, between the first user and the first candidate user, may be based on the first quantity of times. Matching platform 110 may determine a second quantity of times the third node is visited based on traversing the graphical representation (e.g., a quantity of times the third node is visited during the traversal of the graphical representation). The second measure of similarity, between the first user and the second candidate user, may be based on the second quantity of times.

In some implementations, by determining the first measure of similarity, matching platform 110 may determine a likelihood of the first user using client device 105-1 to perform an action indicating an interest in the first candidate user. Similarly, by determining the second measure of similarity, matching platform 110 may determine a likelihood of the first user using client device 105-1 to perform an action indicating an interest in the second candidate user.

In some implementations, matching platform 110 may traverse a portion of the graphical representation. For example, matching platform 110 may traverse the portion of the graphical representation associated with users that have expressed an interest in a second number threshold of the plurality of first users. By traversing the portion of the graphical representation, matching platform 110 may preserve computing resources, storage resources, etc., that would been wasted by manually (e.g., a device) identifying candidate users for the first user.

Matching platform 110 may be configured with information identifying the second number threshold. Additionally, or alternatively, matching platform 110 may receive the information identifying the second number threshold from a device of an administrator of matching platform 110. In some implementations, the second number threshold may be same as the first number threshold. Alternatively, the second number threshold may be different than the first number threshold.

Figure 1D:
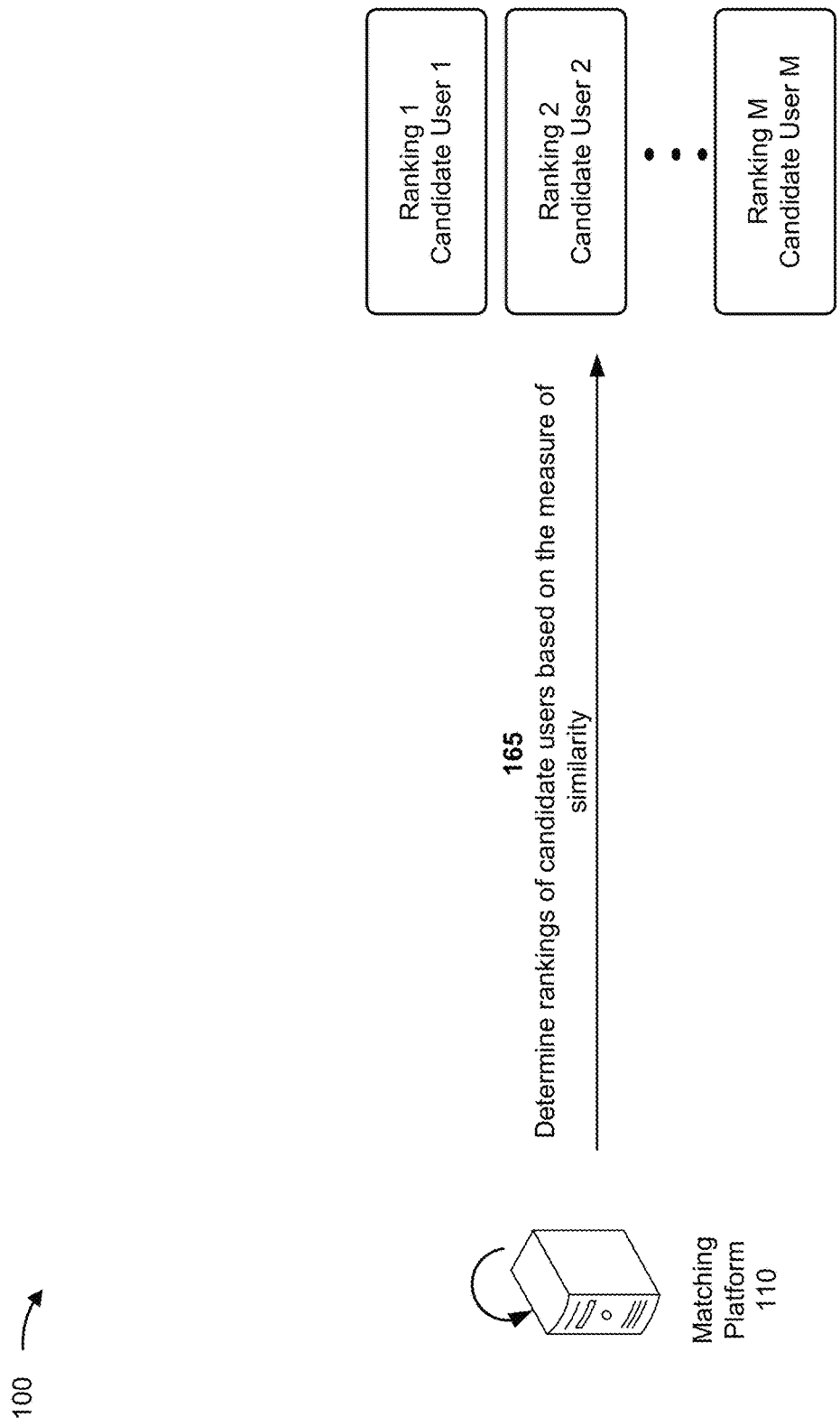

As shown in FIG. 1D, and by reference number 165, matching platform 110 may determine rankings of candidate users based on the measure of similarity. For example, matching platform 110 determine a first ranking of the first candidate user based on the first measure of similarity, determine a second ranking of the second candidate user based on the second measure of similarity, and so on. As an example, if the first measure of similarity exceeds the second measure of similarity, the first candidate user may be ranked higher than the second candidate user. Alternatively, if the second measure of similarity exceeds the first measure of similarity, the second candidate user may be ranked higher than the first candidate user.

Figure 1E:
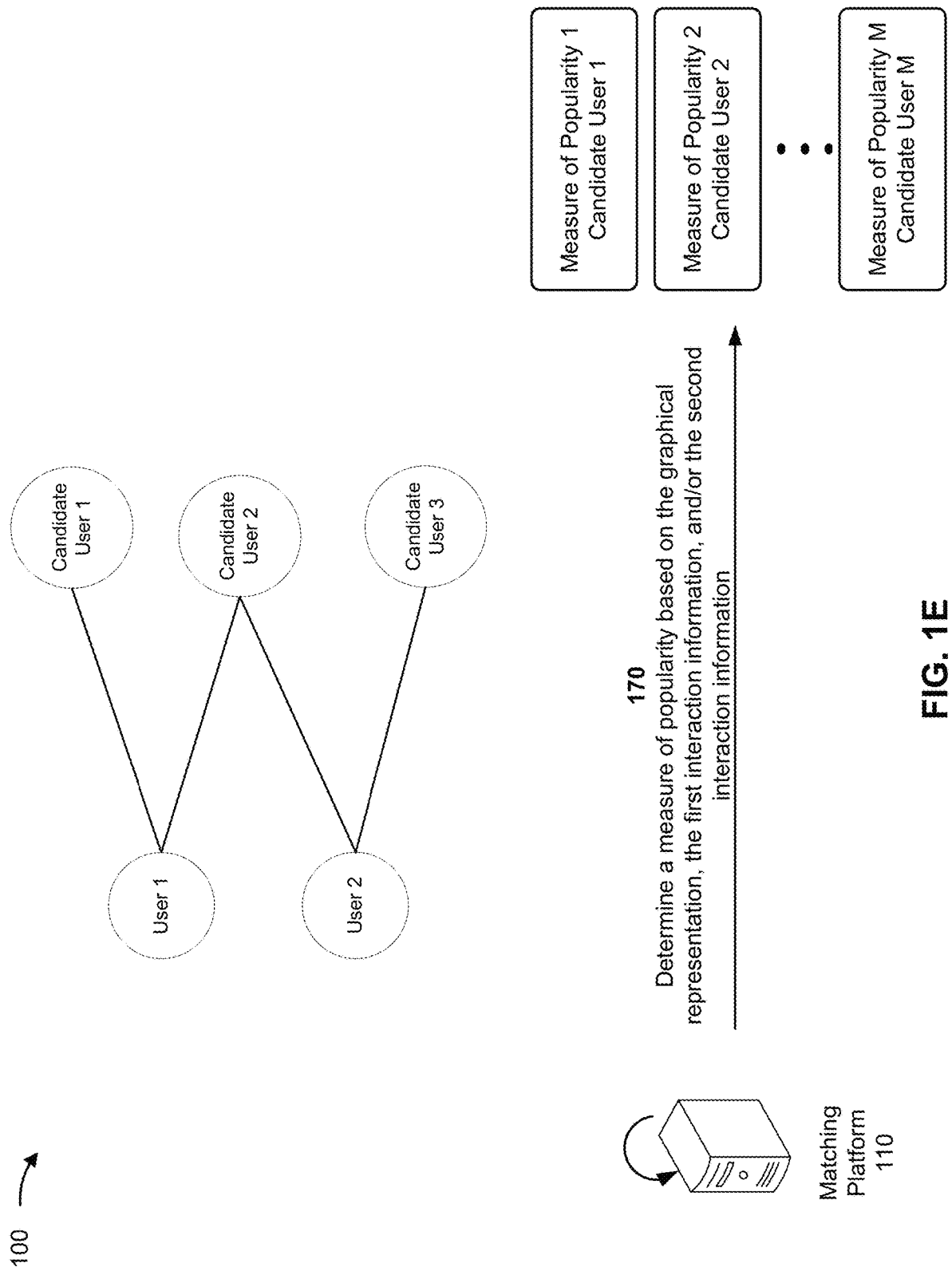

As shown in FIG. 1E, and by reference number 170, matching platform 110 may determine a measure of popularity based on the graphical representation, the first interaction information, or the second interaction information. For example, matching platform 110 may determine a first measure of popularity of the first candidate user, determine a second measure of popularity of the second candidate user, and so on. In some instances, matching platform 110 may determine the measure of popularity using interaction scoring engine 115 (e.g., using the second module of interaction scoring engine 115). In some implementations, the measure of popularity may include a score.

In some implementations, matching platform 110 may determine the first measure of popularity of the first candidate user based on a quantity of actions, performed by one or more client devices 105, indicating an interest in the first candidate user. Matching platform 110 may determine the first measure of popularity based on information stored in interaction data structure 130. For example, matching platform 110 may provide, to interaction data structure 130, a request for the quantity of actions. The request may include information identifying the first candidate user. Based on the request, interaction data structure 130 may provide information identify the quantity of actions (e.g., a quantity of entries including information indicating that a client device 105 has performed an action indicating an interest in the first candidate user). Matching platform 110 may determine the second measure of popularity in a manner similar to the manner described above in connection with determining the first measure of popularity.

In some implementations, matching platform 110 may determine the first measure of popularity of the first candidate user using the graphical representation. For example, matching platform 110 may determine a first likelihood of the second node being visited when the graphical representation is traversed. Matching platform 110 may determine the first likelihood based on a quantity of first users that expressed an interest in the first candidate user and based on a quantity of second users that share a similar interest with the first users (e.g., users that are similar to the first users).

The first likelihood may be based on a first combination of the quantity of first users and the quantity of second users. For example, the quantity of first users and the quantity of second users may be combined using a mathematical operation, such as addition, multiplication, a combination of mathematical operations (e.g., a combination of subtraction, multiplication, division, or addition), etc.

Matching platform 110 may determine the second measure of popularity of the second candidate user using the graphical representation, in a manner similar to the manner for determining the first measure of popularity (e.g., by determining a second likelihood of the third node being visited). Matching platform 110 may determine the second likelihood based on a quantity of third users that expressed an interest in the second candidate user and based on a quantity of fourth users that share a similar interest with the third users (e.g., users that are similar to the third users). The second likelihood may be based on a second combination of the quantity of third users and the quantity of fourth users. The quantity of third users and the quantity of fourth users may be combined in a manner similar to the manner described above in connection with combining the quantity of first users and the quantity of second users.

The first likelihood may exceed the second likelihood when the first combination exceeds the second combination. Alternatively, the second likelihood may exceed the first likelihood when the second combination exceeds the first combination.

Figure 1F:
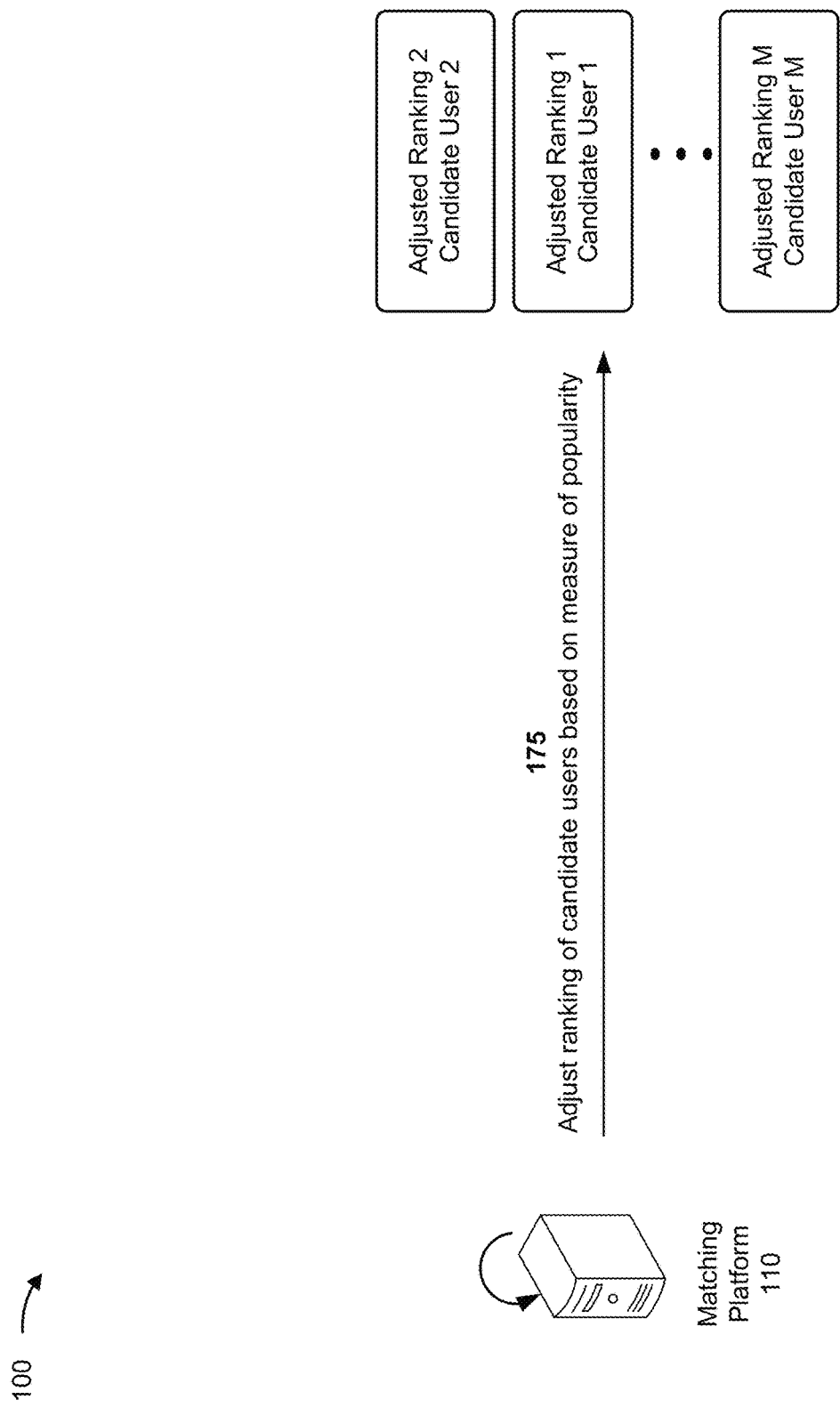

As shown in FIG. 1F, and by reference number 175, matching platform 110 may adjust the ranking of the candidate users based on the measure of popularity. In some implementations, matching platform 110 may adjust the ranking of the candidate users using interaction scoring engine 115 (e.g., using the second module of interaction scoring engine 115). In some implementations, matching platform 110 may adjust the ranking by comparing the measure of popularity and a popularity threshold. Matching platform 110 may decrease the ranking when the measure of popularity satisfies the popularity threshold. Alternatively, matching platform 110 may increase the ranking when the measure of popularity does not satisfy the popularity threshold.

As an example, based on the comparison, matching platform 110 may determine that the first measure of popularity satisfies the popularity threshold and determine that the second measure of popularity does not satisfy the popularity threshold. In some implementations, a measure of popularity may correspond to a quantity of notifications. Matching platform 110 may determine a first quantity of notifications received by a client device 105 of the first candidate user and a second quantity of notifications received by a client device 105 of the second candidate user in a manner similar to the manner described above (e.g., based on the information stored in interaction data structure 130).

Matching platform 110 may determine that the first quantity of notifications satisfies the quantity threshold and determine that the second quantity of notifications does not satisfy the quantity threshold. Based on determining that the first quantity of notifications satisfies the quantity threshold, matching platform 110 may determine that notifications, provided to the client device 105 of the first candidate user, are to be reduced to preserve computing resources, network resources, storage resources and other resources that would have been by the client device 105 to processing the first quantity of notifications, which may be a large quantity of notifications. Accordingly, based on determining that the first measure of popularity exceeds the popularity threshold (e.g., by determining that the first quantity of notifications satisfies the quantity threshold), matching platform 110 may decrease the first ranking to decrease any additional quantity of notifications that may be provided to the client device 105 of the first candidate user.

In some implementations, matching platform 110 may decrease the first ranking by combining the first measure of similarity and the first measure of popularity using a mathematical operation. For example, matching platform 110 may divide the first measure of similarity by the first measure of popularity. Matching platform 110 may decrease the first ranking by dividing the first measure of similarity by a first factor that is based on the first measure of popularity. In some examples, the first factor may be determined by way of hyperparameter optimization.

Dividing the first measure of similarity by the first measure of popularity is merely provided as an example. In practice, the first measure of similarity and the first measure of popularity may be combined using one or more other mathematical operations (e.g., addition, multiplication, and/or subtraction), or combined using a combination of mathematical operations (e.g., a combination of subtraction, multiplication, division, and/or addition), etc.

Based on determining that the second quantity of notifications does not satisfy the quantity threshold, matching platform 110 may determine that notifications, provided to the client device 105 of the second candidate user, are to be increased to preserve computing resources, network resources, storage resources and other resources that would have been used by the client device 105 to provide additional information in order to receive additional notifications. Accordingly, based on determining that the second measure of popularity does not exceed the popularity threshold (e.g., by determining that the second quantity of notifications does not satisfy the quantity threshold), matching platform 110 may increase the second ranking to increase the second quantity of notifications.

In some implementations, matching platform 110 may increase the second ranking by combining the second measure of similarity and the second measure of popularity using a mathematical operation. For example, matching platform 110 may multiply the second measure of similarity by the second measure of popularity. Matching platform 110 may increase the second ranking by multiplying the second measure of similarity by a second factor that is based on the second measure of popularity. In some examples, the second factor may be determined by way of hyperparameter optimization.

As shown in FIG. 1G, and by reference number 185, matching platform 110 may obtain user information regarding one or more users based on the information regarding the first user. For example, matching platform 110 (e.g., using user querying engine 120) provide a user information request to user information data structure 135. The user information request may include the user information regarding the first user. The user information, regarding the first user, may include information identifying the first user and information identifying one or more preferences of the first user. Matching platform 110 may provide the user information request to identify one or more users that are potential matches for the first user based on the user information (e.g., based on one or more of the preferences of the first user). Matching platform 110 may receive, from user information data structure 135, user information regarding the potential matches based on the user information request.

As shown in FIG. 1G, and by reference number 185, matching platform 110 may filter candidate information of ranked candidate users based on the user information. For example, matching platform 110 (e.g., using data integration module 125) may use the user information regarding the potential matches to filter the candidate information regarding the ranked candidate users discussed above (e.g., the first candidate user, the second candidate user, and so on).

In some implementations, when filtering the candidate information, matching platform 110 may compare the user information and the candidate information to determine whether the potential matches include one or more of the candidate users. For example, matching platform 110 may remove, from the candidate information, information of any candidate user that is not included in the potential matches. For example, if the potential matches users include the first candidate user and the second candidate user but do not include a third candidate user, matching platform 110 may remove information regarding the third candidate user. Matching platform 110 may generate a filtered candidate information as a result of filtering the candidate information.

As shown in FIG. 1G, and by reference number 190, matching platform 110 may provide filtered candidate information. For example, matching platform 110 may provide the filtered candidate information to client device 105-1 of the first user. The filtered candidate information may be ranked based on the adjusted rankings discussed above. As shown in FIG. 1G, the potential matches may include the first candidate user and the second candidate user. Accordingly, the candidate information of the first candidate user and the second candidate user may be ranked according to the adjusted first ranking and the adjusted second ranking, accordingly.

In some implementations, matching platform 110 may identify candidate entities using a machine learning model that is trained to identify candidate entities. As an example, matching platform 110 may provide (as an input to the machine learning model) the user information regarding the first user, the first interaction information, the second interaction information, the quantity threshold, the first number threshold, and/or the second number threshold. The machine learning model may provide, as an input, candidate information of the candidate users.

The machine learning model may be trained as described in more detail below in connection with FIG. 2. In some examples, matching platform 110 may train the machine learning model. Additionally, or alternatively, a different device may generate and train the machine learning model. The machine learning model may be trained based on historical data that includes user information, interaction information, threshold information (e.g., quantity thresholds, first number thresholds, second number thresholds), etc.

By processing the interaction information as described herein, the system may preserve computing, network, storage, and other resources that would have been used to process large quantity of notifications, provided additional information regarding entities, and process the information regarding the entities.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
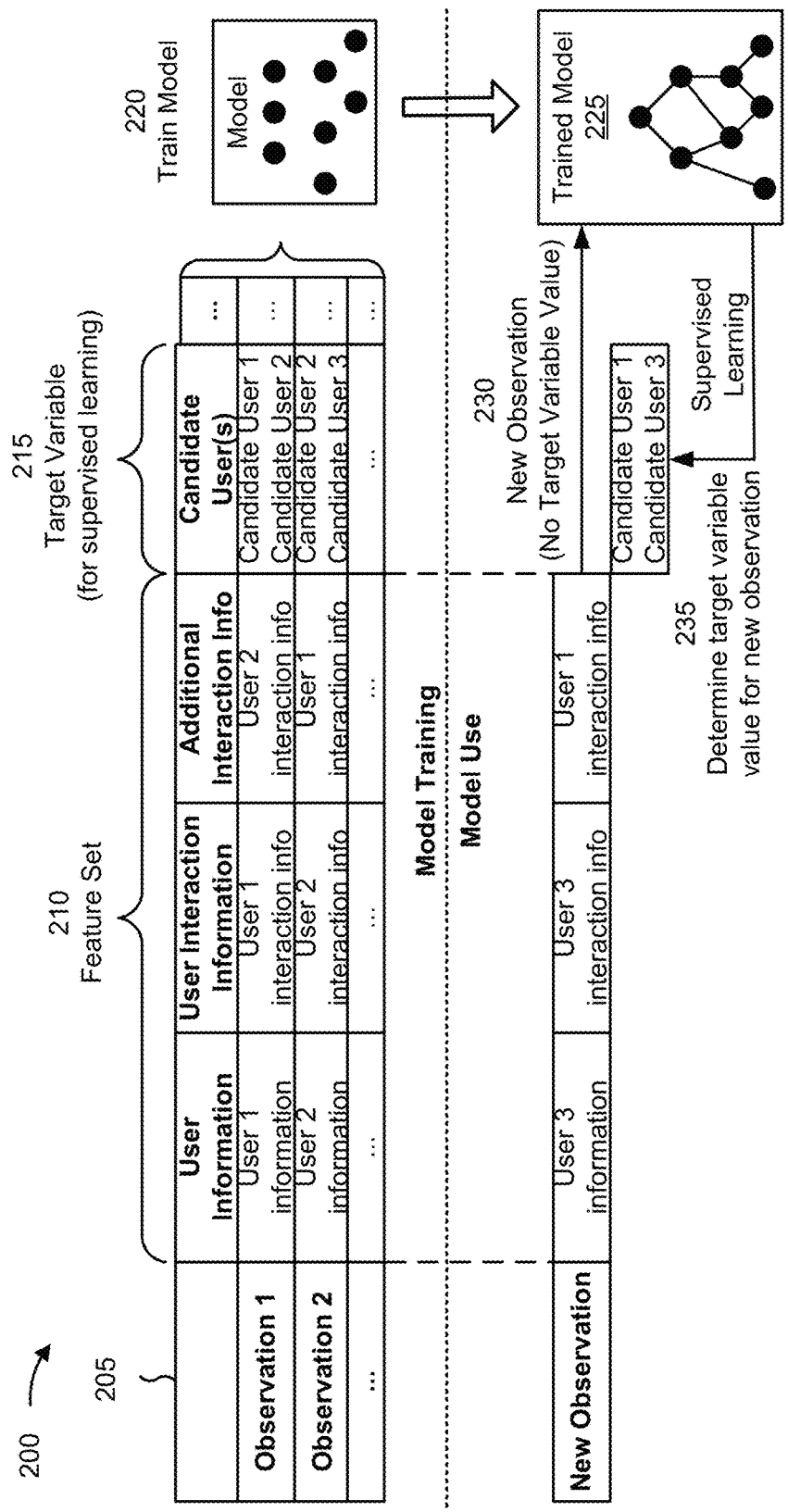
FIG. 2 is a diagram illustrating an example of training and using a machine learning model in connection with balancing device notifications.

FIG. 2 is a diagram illustrating an example 200 of training and using a machine learning model in connection with balancing device notifications. The machine learning model training and usage described herein may be performed using a machine learning system. The machine learning system may include or may be included in a computing device, a server, a cloud computing environment, or the like, such as mm described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from matching platform 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from matching platform 110. For example, the machine learning system may identify a feature set (e.g., one or more features or feature values) by extracting the feature set from structured data, by performing natural language processing to extract the feature set from unstructured data, and/or by receiving input from an operator.

As an example, a feature set for a set of observations may include a first feature of user information, a second feature of user interaction information, a third feature of additional interaction information, and so on. As shown, for a first observation, the first feature may have a value of user 1 information, the second feature may have a value of user 1 interaction info, the third feature may have a value of user 2 interaction info, and so on. These features and feature values are provided as examples, and may differ in other examples. For example, the feature set may include one or more of the following features: a quantity threshold, a first number threshold, a second number threshold, a popularity threshold, among other information described herein to identify candidate entities.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) or may represent a variable having a Boolean value. A target variable may be associated with a target variable value, and a target variable value may be specific to an observation. In example 200, the target variable is Candidate User(s), which has a value of Candidate User 1 and Candidate User 2 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of User 3 information, a second feature of User 3 interaction info, a third feature of User 1 interaction info, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of Candidate User 1 and Candidate User 3 for the target variable of Candidate User(s) for the new observation, as shown by reference number 235. Based on this prediction, the machine learning system may provide a first recommendation, may provide output for determination of a first recommendation, may perform a first automated action, or may cause a first automated action to be performed (e.g., by instructing another device to perform the automated action), etc. The first recommendation may include, for example, recommend Candidate User 1 and Candidate User 3. The first automated action may include, for example, providing candidate information for Candidate User 1 and Candidate User 3.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), or may be based on a cluster in which the new observation is classified.

In this way, the machine learning system may apply a rigorous and automated process to balance device notifications. The machine learning system enables recognition and/or identification of tens, hundreds, thousands, or millions of features or feature values for tens, hundreds, thousands, or millions of observations, thereby increasing accuracy and consistency and reducing delay associated with balance device notifications relative to requiring computing resources to be allocated for tens, hundreds, or thousands of operators to manually balance device notifications using the features or feature values.

As indicated above, FIG. 2 is provided as an example. Other examples may differ from what is described in connection with FIG. 2.

Figure 3:
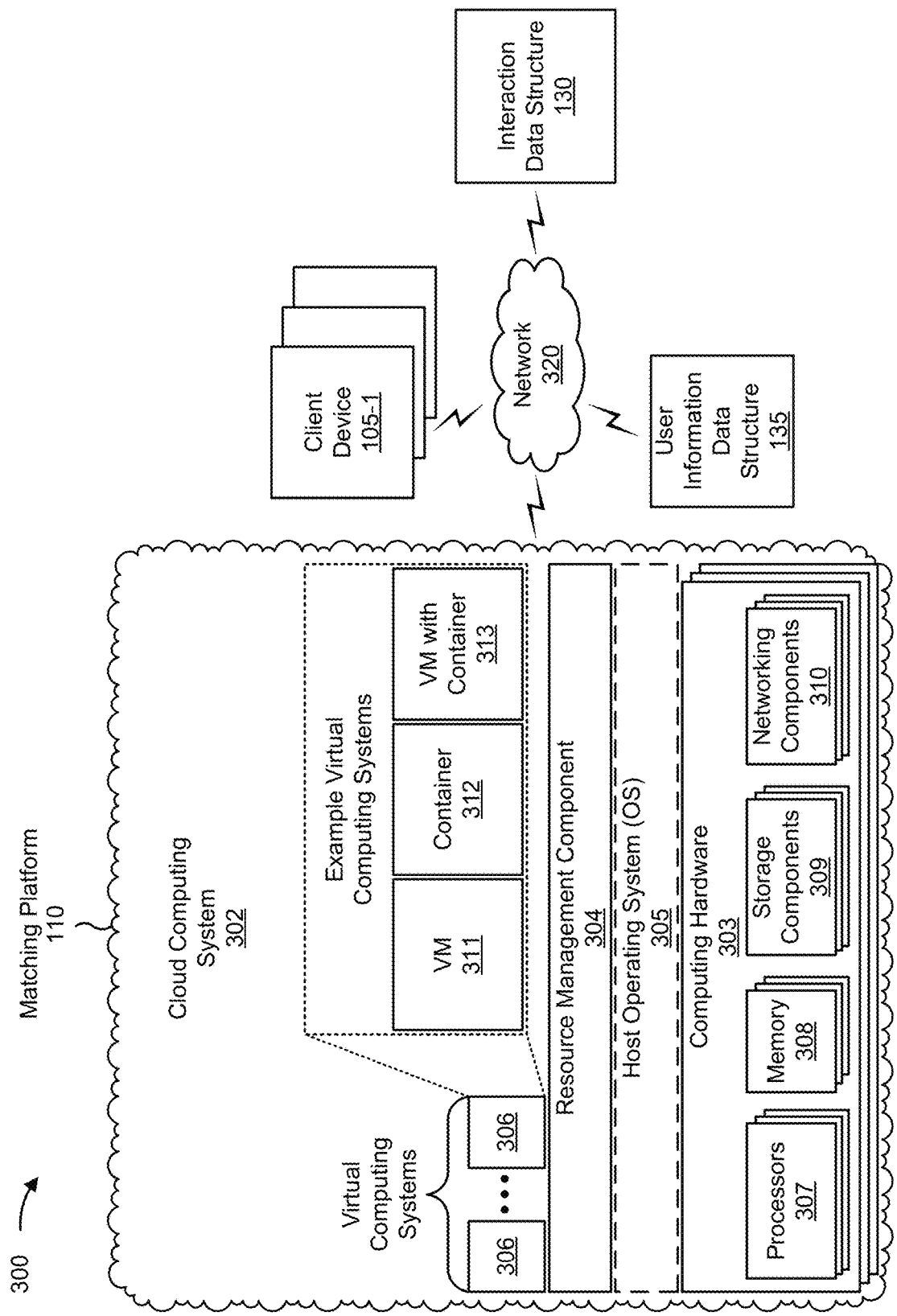
FIG. 3 is a diagram of an example environment in which systems and/or methods described herein may be implemented.

FIG. 3 is a diagram of an example environment 300 in which systems or methods described herein may be implemented. As shown in FIG. 3, environment 300 may include a matching platform 110, which may include one or more elements of and/or may execute within a cloud computing system 302. The cloud computing system 302 may include one or more elements 303-313, as described in more detail below. As further shown in FIG. 3, environment 300 may include a network 320, client devices 105, interaction data structure 130, or user information data structure 135. Client devices 105, interaction data structure 130, or user information data structure 135 have been described above in connection with FIG. 1A. As an example, a client device 105 may include a communication device or a computing device. For instance, a client device 105 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. Devices or elements of environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, or a hybrid environment 313 that includes a virtual machine and a container, etc. A virtual computing system 306 may execute one or more applications using a file system that includes binary files, software libraries, and/or other resources required to execute applications on a guest operating system (e.g., within the virtual computing system 306) or the host operating system 305.

Although the matching platform 110 may include one or more elements 303-313 of the cloud computing system 302, may execute within the cloud computing system 302, and/or may be hosted within the cloud computing system 302, in some implementations, the matching platform 110 may not be cloud-based (e.g., may be implemented outside of a cloud computing system) or may be partially cloud-based. For example, the matching platform 110 may include one or more devices that are not part of the cloud computing system 302, such as device 400 of FIG. 4, which may include a standalone server or another type of computing device. The matching platform 110 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
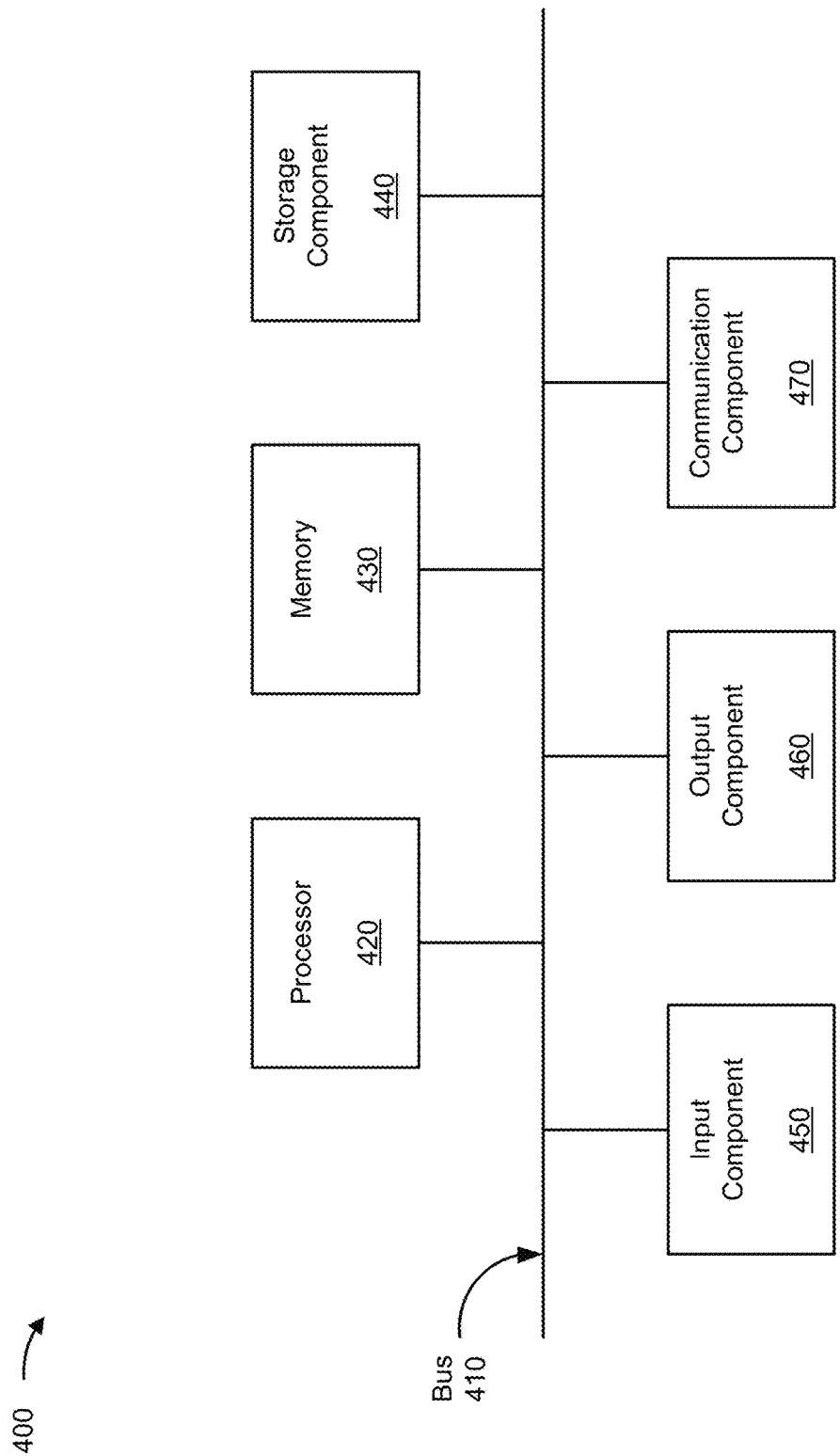
FIG. 4 is a diagram of example components of one or more devices of FIG. 3.

FIG. 4 is a diagram of example components of a device 400, which may correspond to matching platform 110, client device 105, user information data structure 135, and/or interaction data structure 130. In some implementations, matching platform 110, client device 105, user information data structure 135, and/or interaction data structure 130 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired or wireless communication among the components of device 400. Processor 420 includes a central processing unit, a graphics processing unit, a microprocessor, a controller, a microcontroller, a digital signal processor, a field-programmable gate array, an application-specific integrated circuit, or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, or an optical memory).

Storage component 440 stores information and software related to the operation of device 400. For example, storage component 440 may include a hard disk drive, a magnetic disk drive, an optical disk drive, a solid-state disk drive, a compact disc, a digital versatile disc, or another type of non-transitory computer-readable medium. Input component 450 enables device 400 to receive input, such as user input or sensed inputs. For example, input component 450 may include a touch screen, a keyboard, a keypad, a mouse, a button, a microphone, a switch, a sensor, a global positioning system component, an accelerometer, a gyroscope, or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 or storage component 440) may store a set of instructions (e.g., one or more instructions, code, software code, and program code) for execution by processor 420. Processor 420 may execute the set of instructions to perform one or more processes described herein. In some implementations, execution of the set of instructions, by one or more processors 420, causes the one or more processors 420 or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
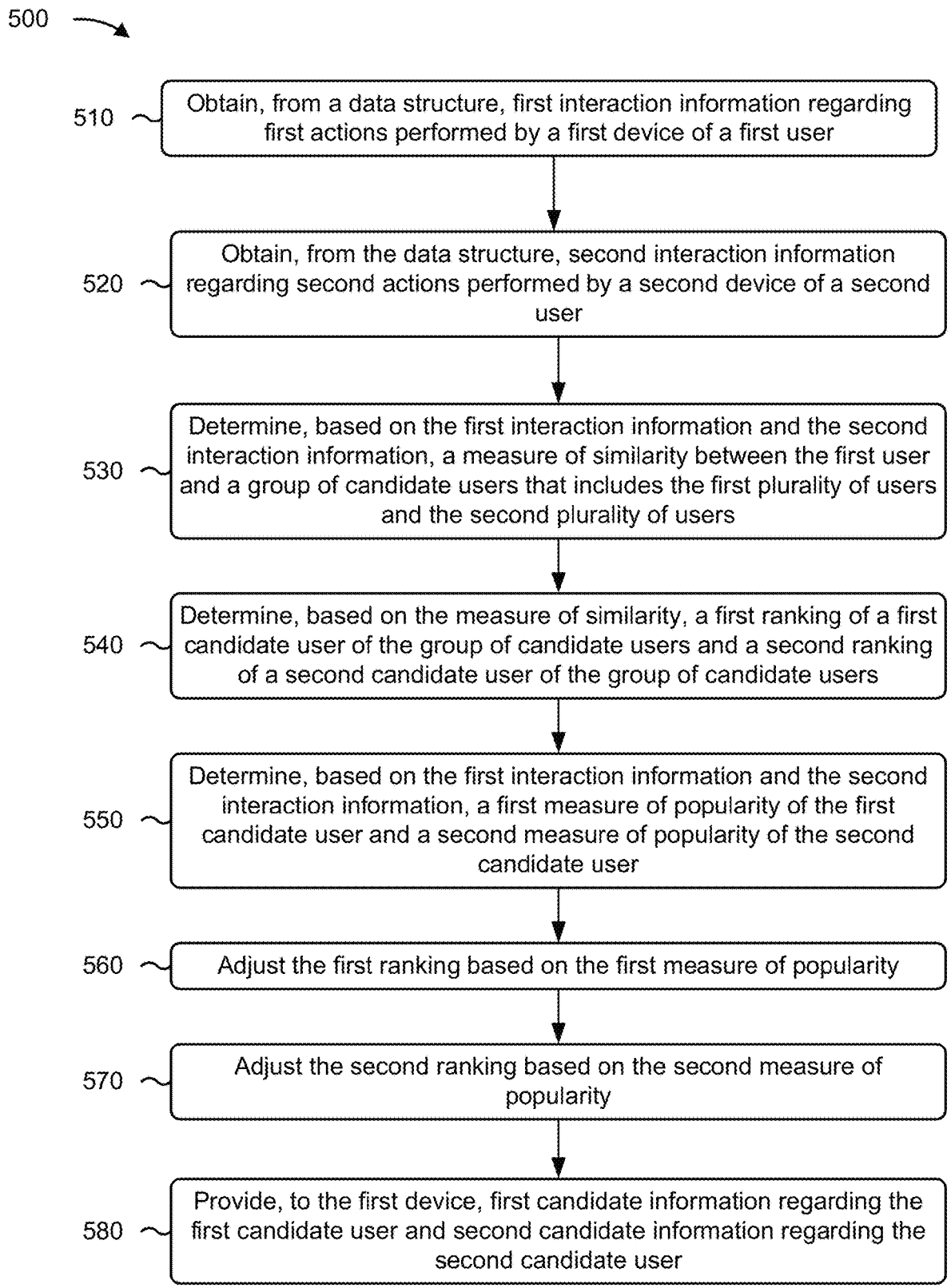
FIG. 5 is a flowchart of an example process relating to balancing device notifications.

FIG. 5 is a flowchart of an example process 500 relating to balancing device notifications. In some implementations, one or more process blocks of FIG. 5 may be performed by a system (e.g., matching platform 110). In some implementations, one or more process blocks of FIG. 5 may be performed by another device or a group of devices separate from or including the system, such as a client device (e.g., client device 105), an interaction data structure (e.g., interaction data structure 130), or a user information data structure (e.g., user information data structure 135). Additionally, or alternatively, one or more process blocks of FIG. 5 may be performed by one or more components of device 400, such as processor 420, memory 430, storage component 440, input component 450, output component 460, or communication component 470.

As shown in FIG. 5, process 500 may include obtaining, from a data structure, first interaction information regarding first actions performed by a first device of a first user, wherein the first actions cause notifications to be provided to devices of a first plurality of users (block 510). For example, the system may obtain, from a data structure, first interaction information regarding first actions performed by a first device of a first user, wherein the first actions cause notifications to be provided to devices of a first plurality of users, as described above.

As further shown in FIG. 5, process 500 may include obtaining, from the data structure, second interaction information regarding second actions performed by a second device of a second user, wherein the second actions cause notifications to be provided to devices of a second plurality of users, and wherein the first plurality of users includes the second user or at least one of the second plurality of users (block 520). For example, the system may obtain, from the data structure, second interaction information regarding second actions performed by a second device of a second user, wherein the second actions cause notifications to be provided to devices of a second plurality of users, and wherein the first plurality of users includes the second user or at least one of the second plurality of users, as described above.

As further shown in FIG. 5, process 500 may include determining, based on the first interaction information and the second interaction information, a measure of similarity between the first user and a group of candidate users that includes the first plurality of users and the second plurality of users (block 530). For example, the system may determine, based on the first interaction information and the second interaction information, a measure of similarity between the first user and a group of candidate users that includes the first plurality of users and the second plurality of users, as described above.

As further shown in FIG. 5, process 500 may include determining, based on the measure of similarity, a first ranking of a first candidate user of the group of candidate users and a second ranking of a second candidate user of the group of candidate users (block 540). For example, the system may determine, based on the measure of similarity, a first ranking of a first candidate user of the group of candidate users and a second ranking of a second candidate user of the group of candidate users, as described above.

As further shown in FIG. 5, process 500 may include determining, based on the first interaction information and the second interaction information, a first measure of popularity of the first candidate user and a second measure of popularity of the second candidate user (block 550). For example, the system may determine, based on the first interaction information and the second interaction information, a first measure of popularity of the first candidate user and a second measure of popularity of the second candidate user, as described above.

As further shown in FIG. 5, process 500 may include adjusting the first ranking based on the first measure of popularity (block 560). For example, the system may adjust the first ranking based on the first measure of popularity, as described above.

As further shown in FIG. 5, process 500 may include adjusting the second ranking based on the second measure of popularity (block 570). For example, the system may adjust the second ranking based on the second measure of popularity, as described above.

As further shown in FIG. 5, process 500 may include providing, to the first device, first candidate information regarding the first candidate user and second candidate information regarding the second candidate user, wherein the first candidate information and the second candidate information are ranked based on the adjusted first ranking and the adjusted second ranking (block 580). For example, the system may provide, to the first device, first candidate information regarding the first candidate user and second candidate information regarding the second candidate user, wherein the first candidate information and the second candidate information are ranked based on the adjusted first ranking and the adjusted second ranking, as described above. In some implementations, the first candidate information and the second candidate information are ranked based on the adjusted first ranking and the adjusted second ranking.

Process 500 may include additional implementations, such as any single implementation or any combination of implementations described below or in connection with one or more other processes described elsewhere herein.

In a first implementation, the first actions indicate an interest of the first user in the first plurality of users, wherein the second actions indicate an interest of the second user in the second plurality of users, and wherein the first actions and the second actions are based on interacting with information regarding the first plurality of users and information regarding the second plurality of users.

In a second implementation, process 500 includes traversing, using a computational algorithm, a graphical representation generated based on the first interaction information and the second interaction information, wherein the graphical representation includes a plurality of nodes, wherein the plurality of nodes includes a first node representing the first user, a second node representing the first candidate user, and a third node representing the second candidate user.

In a third implementation, process 500 includes traversing the graphical representation using multiple paths, determining a first quantity of times the second node is visited based on traversing the graphical representation, wherein a first measure of similarity, between the first user and the first candidate user, is based on the first quantity of times, and determining a second quantity of times the third node is visited based on traversing the graphical representation, wherein a second measure of similarity, between the first user and the second candidate user, is based on the second quantity of times.

In a fourth implementation, process 500 includes determining, based on information stored in the data structure, a quantity of actions, performed by one or more devices, indicating an interest in the first candidate user, and wherein the one or more processors, to determine the second measure of popularity, are configured to determining, based on information stored in the data structure, a quantity of actions, performed by one or more devices, indicating an interest in the second candidate user.

In a fifth implementation, process 500 includes determining that the first measure of popularity satisfies a popularity threshold, and decreasing the first ranking, based on determining that the first measure of popularity satisfies the popularity threshold, to decrease a quantity of notifications provided to a device of the first candidate user, and wherein the one or more processors, to adjust the first ranking based on the first measure of popularity, are configured to determining that the second measure of popularity does not satisfy the popularity threshold, and increasing the second ranking, based on determining that the second measure of popularity does not satisfy the popularity threshold, to increase a quantity of notifications provided to a device of the second candidate user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and methods described herein may be implemented in different forms of hardware, software, or firmware, or combinations of hardware, firmware, and software. The actual specialized control hardware or software code used to implement these systems and methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for balancing device notifications, the system comprising:
   one or more memories; and
   one or more processors, communicatively coupled to the one or more memories, configured to:
      obtain, from a data structure, first interaction information regarding first actions performed by a first device of a first user, wherein the first actions cause notifications to be provided to devices of a first plurality of users;
      obtain, from the data structure, second interaction information regarding second actions performed by a second device of a second user, wherein the second actions cause notifications to be provided to devices of a second plurality of users, and wherein the first plurality of users includes the second user or at least one of the second plurality of users;
      determine, based on the first interaction information and the second interaction information, a measure of similarity between the first user and a group of candidate users that includes the first plurality of users and the second plurality of users;

determine, based on the measure of similarity, a first ranking of a first candidate user of the group of candidate users and a second ranking of a second candidate user of the group of candidate users;

determine, based on the first interaction information and the second interaction information, a first measure of popularity of the first candidate user and a second measure of popularity of the second candidate user, wherein the one or more processors, to determine the first measure of popularity of the first candidate user and the second measure of popularity, are configured to:

determine the first measure of popularity based on a first quantity of notifications, from a first plurality of devices, received by a device of the first candidate user, and determine the second measure of popularity based on a second quantity of notifications, from a second plurality of devices, received by a device of the second candidate user;

decrease the first ranking when the first quantity of notifications satisfies a quantity threshold to decrease notifications received by the device of the first candidate user;

increase the second ranking when the second quantity of notifications does not satisfy the quantity threshold to increase notifications received by the device of the second candidate user; and provide, to the first device, first candidate information regarding the first candidate user and second candidate information regarding the second candidate user, wherein the first candidate information and the second candidate information are ranked based on the decreased first ranking and the increased second ranking.

2. The system of claim 1, wherein the first actions indicate an interest of the first user in the first plurality of users, wherein the second actions indicate an interest of the second user in the second plurality of users, and wherein the first actions and the second actions are based on interacting with information regarding the first plurality of users and information regarding the second plurality of users.

3. The system of claim 1, wherein the one or more processors, to determine the measure of similarity, are configured to:

traverse, using a computational algorithm, a graphical representation generated based on the first interaction information and the second interaction information, wherein the graphical representation includes a plurality of nodes, wherein the plurality of nodes includes a first node representing the first user, a second node representing the first candidate user, and a third node representing the second candidate user.

4. The system of claim 3, wherein the one or more processors, to traverse the graphical representation, are configured to:

traverse the graphical representation using multiple paths, determine a first quantity of times the second node is visited based on traversing the graphical representation, wherein a first measure of similarity, between the first user and the first candidate user, is based on the first quantity of times, and determine a second quantity of times the third node is visited based on traversing the graphical representation, wherein a second measure of similarity, between the first user and the second candidate user, is based on the second quantity of times.

5. The system of claim 1, wherein the one or more processors, to determine the first measure of popularity, are configured to:

determine, based on information stored in the data structure, a quantity of actions, performed by one or more devices, indicating an interest in the first candidate user; and wherein the one or more processors, to determine the second measure of popularity, are configured to:

determine, based on information stored in the data structure, a quantity of actions, performed by one or more devices, indicating an interest in the second candidate user.

6. The system of claim 1, wherein the one or more processors are configured to:

determine that the first measure of popularity satisfies a popularity threshold based on determining that the first quantity of notifications satisfies the quantity threshold; and determine that the second measure of popularity does not satisfy the popularity threshold based on determining that the second quantity of notifications does not satisfy the quantity threshold.

7. The system of claim 1, wherein the one or more processors are further configured to:

generate a graphical representation generated based on the first interaction information and the second interaction information, wherein the graphical representation includes a plurality of nodes, wherein the plurality of nodes includes a first node representing the first user, a second node representing the first candidate user, and a third node representing the second candidate user, and wherein the one or more processors, to determine the first measure of popularity, are configured to:

determine a first likelihood of the second node being visited when the graphical representation is traversed; and wherein the one or more processors, to determine the second measure of popularity, are configured to:

determine a second likelihood of the second node being visited when the graphical representation is traversed.

8. A non-transitory computer-readable medium storing a set of instructions, the set of instructions comprising:

one or more instructions that, when executed by one or more processors of a device, cause the device to:

obtain, from a data structure, first interaction information regarding first actions performed by a first device of a first entity, wherein the first actions cause notifications to be provided to devices of a first plurality of entities;

obtain, from the data structure, second interaction information regarding second actions performed by a second device of a second entity, wherein the second actions cause notifications to be provided to devices of a second plurality of entities;

determine, based on the first interaction information and the second interaction information, a first measure of similarity between the first entity and a first candidate entity from a group of candidate entities that includes the first plurality of entities and the
second plurality of entities, wherein a first ranking of
the first candidate entity is based on the first measure
of similarity;
determine, based on the first interaction information
and the second interaction information, a second
measure of similarity between the first entity and a
second candidate entity from the group of candidate
entities, wherein a second ranking of the second
candidate entity is based on the second measure of
similarity;
determine, based on the first interaction information
and the second interaction information, a first measure of popularity of the first candidate entity and a
second measure of popularity of the second candidate entity,
wherein the first measure of popularity is determined
based on a first quantity of notifications, from a
first plurality of devices, received by a device of
the first candidate entity, and
wherein the second measure of popularity is determined based on a second quantity of notifications,
from a second plurality of devices, received by a
device of the second candidate entity;
decrease the first ranking of the first candidate entity to
decrease notifications received by the device of the
first candidate entity based on the first quantity of
notifications satisfying a quantity threshold;
increase the second ranking of the second candidate
entity to increase notifications received by the device
of the second candidate entity based on the second
quantity of notifications not satisfying the quantity
threshold; and
provide, to the first device, first candidate information
regarding the first candidate entity and second candidate information regarding the second candidate
entity,
wherein the first candidate information is ranked
based on the decreased first ranking, and
wherein the second candidate information is ranked
based on the increased second ranking.

9. The non-transitory computer-readable medium of claim
8, wherein the data structure is a first data structure,
wherein the group of candidate entities include a third
candidate entity,
wherein the one or more instructions, when executed by
the one or more processors, further cause the device to:
obtain, from a second data structure and based on
information identifying the first entity, one or more
preferences of the first entity;
obtain, from the second data structure, user information
regarding one or more entities based on the one or
more preferences of the first entity; and
filter candidate information, regarding the group of
candidate entities, to remove third candidate information regarding the third candidate entity,
wherein the candidate information is filtered based
on the user information.

10. The non-transitory computer-readable medium of
claim 8, wherein the one or more instructions, when
executed by the one or more processors, further cause the
device to:
decrease the first ranking of the first candidate entity
based on a first factor that is based on the first measure
of popularity; and
increase the second ranking of the second candidate entity
based on a second factor that is based on the second
measure of popularity.

11. The non-transitory computer-readable medium of
claim 8, wherein the one or more instructions, that cause the
device to determine the first measure of similarity, cause the
device to:
determine a likelihood of the first entity using the first
device to perform an action indicating an interest in the
first candidate entity; and
wherein the one or more instructions, that cause the
device to determine the second measure of similarity,
cause the device to:
determine a likelihood of the first entity using the first
device to perform an action indicating an interest in the
second candidate entity.

12. The non-transitory computer-readable medium of
claim 8, wherein the one or more instructions, when
executed by the one or more processors, further cause the
device to:
determine that the first plurality of entities including the
second entity or includes at least one of the second
plurality of entities;
determine that the first entity and the second entity share
a similar interest based on determining that the first
plurality of entities includes the second entity or
includes the at least one of the second plurality of
entities; and
determine that the group of candidate entities is to include
the second plurality of entities based on determining
that the first entity and the second entity share a similar
interest.

13. The non-transitory computer-readable medium of
claim 8, wherein the one or more instructions, when
executed by the one or more processors, further cause the
device to:
generate a graphical representation based on the first
interaction information and the second interaction
information,
wherein the graphical representation includes a plurality of nodes,
wherein the plurality of nodes includes a first node
representing the first entity, a second node representing the first candidate entity, and a third node representing the second candidate entity,
wherein the one or more instructions, that cause the
device to determine the first measure of popularity,
cause the device to:
determine a first likelihood of the second node being
visited when the graphical representation is traversed; and
wherein the one or more instructions, that cause the
device to determine the second measure of popularity,
cause the device to:
determine a second likelihood of the third node being
visited when the graphical representation is traversed.

14. The non-transitory computer-readable medium of
claim 13, wherein the one or more instructions, that cause
the device to determine the first likelihood, cause the device
to:
determine the first likelihood based on a first quantity of
first entities that expressed an interest in the first
candidate entity and based on a second quantity of
second entities that share a similar interest with the first
entities, and wherein the one or more instructions, that cause the device to determine the second likelihood, cause the device to:
determine the second likelihood based on a third quantity of third entities that expressed an interest in the second candidate entity and based on a fourth quantity of fourth entities that share a similar interest with the third entities.

15. A method for balancing device notifications, the method comprising:
obtaining, by one or more devices and from a data structure, first interaction information regarding first actions performed by a first device of a first entity, wherein the first actions cause notifications to be provided to devices of a first plurality of entities;
obtaining, by the one or more devices and from the data structure, second interaction information regarding second actions performed by a second device of a second entity, wherein the second actions cause notifications to be provided to devices of a second plurality of entities;
determining, by the one or more devices and based on the first interaction information and the second interaction information, a first measure of similarity between the first entity and a first candidate entity from a group of candidate entities, wherein a first ranking of the first candidate entity is based on the first measure of similarity, and wherein the group of candidate entities includes the first plurality of entities and the second plurality of entities;
determining, by the one or more devices and based on the first interaction information and the second interaction information, a second measure of similarity between the first entity and a second candidate entity from the group of candidate entities, wherein a second ranking of the second candidate entity is based on the second measure of similarity;
determining, by the one or more devices and based on the first interaction information and the second interaction information, a first measure of popularity of the first candidate entity and a second measure of popularity of the second candidate entity,
wherein the first measure of popularity is determined based on a first quantity of notifications, from a first plurality of devices, received by a device of the first candidate entity, and
wherein the second measure of popularity is determined based on a second quantity of notifications, from a second plurality of devices, received by a device of the second candidate entity;
adjusting the first ranking based on the first quantity of notifications;
adjusting the second ranking based on the second quantity of notifications; and
providing, by the one or more devices and to the first device, first candidate information regarding the first candidate entity and second candidate information regarding the second candidate entity,
wherein the first candidate information is provided based on the adjusted first ranking, and
wherein the second candidate information is provided based on the adjusted second ranking.

16. The method of claim 15, wherein adjusting the first ranking comprises:
adjusting the first ranking based on the first measure of popularity to decrease notifications received by the device of the first candidate entity; and
wherein adjusting the second ranking comprises:
adjusting the second ranking based on the second measure of popularity to increase notifications received by the device of the second candidate entity.

17. The method of claim 15, wherein adjusting the first ranking comprises:
determining that the first measure of popularity satisfies a popularity threshold, and
decreasing the first ranking, based on determining that the first measure of popularity satisfies the popularity threshold, to decrease a quantity of notifications provided to the device of the first candidate entity, and
wherein adjusting the second ranking comprises:
determining that the second measure of popularity does not satisfy the popularity threshold, and
increasing the second ranking, based on determining that the second measure of popularity does not satisfy the popularity threshold, to increase a quantity of notifications provided to the device of the second candidate entity.

18. The method of claim 15, wherein the data structure is a first data structure,
wherein the group of candidate entities include a third candidate entity,
wherein the method further comprises:
obtaining, from a second data structure and based on information identifying the first entity, one or more preferences of the first entity;
obtaining, from the second data structure, user information regarding one or more entities based on the one or more preferences of the first entity; and
filtering candidate information, regarding the group of candidate entities, to remove third candidate information regarding the third candidate entity,
wherein the candidate information is filtered based on the user information.

19. The method of claim 15, further comprising:
traversing, using a computational algorithm, a graphical representation generated based on the first interaction information and the second interaction information,
wherein the graphical representation includes a plurality of nodes,
wherein the plurality of nodes includes a first node representing the first entity, a second node representing the first candidate entity, and a third node representing the second candidate entity;
wherein determining the first measure of similarity includes:
determining a first quantity of times the second node is visited based on traversing the graphical representation,
wherein the first measure of similarity is based on the first quantity of times; and
wherein determining the second measure of similarity includes:
determining a second quantity of times the third node is visited based on traversing the graphical representation,
wherein the second measure of similarity is based on the second quantity of times.

20. The method of claim 15, wherein determining the first measure of popularity comprises:
determining a first likelihood of the first candidate information being accessed by one or more devices; and
wherein determining the first measure of popularity comprises:

determining a second likelihood of the second candidate information being accessed by one or more devices.

\* \* \* \* \*